(12) United States Patent
Iyer et al.

(10) Patent No.: US 6,844,391 B1
(45) Date of Patent: Jan. 18, 2005

(54) ADHESIVES WITH IMPROVED RIVET PROPERTIES AND LAMINATES USING THE SAME

(75) Inventors: Pradeep Iyer, Hacienda Heights, CA (US); Gerhild Lamb, Upland, CA (US); Prakash Mallya, Sierra Madre, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/404,047

(22) Filed: Sep. 23, 1999

Related U.S. Application Data
(60) Provisional application No. 60/101,538, filed on Sep. 23, 1998.

(51) Int. Cl.$^7$ .............................................. C08L 39/00
(52) U.S. Cl. ...................... 524/515; 524/516; 524/521; 524/522; 524/523; 524/272; 428/355 R; 428/355 AC
(58) Field of Search ................................ 524/272, 548; 525/205; 526/264

(56) References Cited

U.S. PATENT DOCUMENTS

| | | | |
|---|---|---|---|
| 2,555,564 A | 6/1951 | Berman ...................... 117/122 |
| RE23,843 E | 6/1954 | Oace et al. | |
| RE24,906 E | 12/1960 | Ulrich | |
| 3,036,945 A | 5/1962 | Souza ....................... 154/53.5 |
| 3,284,423 A | 11/1966 | Knapp ...................... 260/80.5 |
| 3,301,741 A | 1/1967 | Hendrickson et al. ...... 161/119 |
| 3,314,838 A | 4/1967 | Erwin | |
| 3,331,729 A | 7/1967 | Danielson et al. | |
| 3,346,105 A | 10/1967 | Nye et al. | |
| 3,413,168 A | 11/1968 | Danielson et al. | |
| 3,728,148 A | 4/1973 | Pietsch et al. ............ 117/93.31 |
| 4,054,697 A | 10/1977 | Reed et al. .................... 428/40 |
| 4,364,972 A | 12/1982 | Moon ........................ 427/54.1 |
| 4,370,380 A | 1/1983 | Shah .......................... 428/355 |
| 4,376,151 A | 3/1983 | Parrotta ..................... 428/323 |
| 4,510,197 A | 4/1985 | Shah .......................... 428/220 |
| 4,556,595 A | 12/1985 | Ochi | |
| 4,587,152 A | 5/1986 | Gleichenhagen et al. | |
| 4,605,592 A | 8/1986 | Paquette et al. | |
| 4,612,242 A | 9/1986 | Vesley et al. | |
| 4,666,771 A | 5/1987 | Vesley et al. | |
| 4,735,837 A | 4/1988 | Miyasaka et al. | |
| 4,761,320 A | 8/1988 | Coburn, Jr. | |
| 4,780,491 A | 10/1988 | Vesley et al. | |
| 4,812,541 A * | 3/1989 | Mallya et al. ............... 526/264 |
| 4,818,610 A | 4/1989 | Zimmerman et al. ....... 428/345 |
| 4,855,170 A | 8/1989 | Darvell et al. | |
| 4,889,234 A | 12/1989 | Sorensen et al. | |
| 4,940,852 A | 7/1990 | Chernack | |
| 4,968,562 A | 11/1990 | Delgado .................... 428/402 |
| 4,988,742 A * | 1/1991 | Moon et al. ................... 522/79 |
| 4,994,322 A | 2/1991 | Delgado et al. | |
| 5,008,139 A | 4/1991 | Ochi et al. | |
| 5,061,535 A | 10/1991 | Kreckel et al. | |
| 5,073,457 A | 12/1991 | Blackwell | |
| 5,080,957 A | 1/1992 | Leseman et al. | |
| 5,130,185 A | 7/1992 | Ness ............................ 428/40 |
| 5,141,790 A | 8/1992 | Calhoun et al. | |
| 5,194,299 A | 3/1993 | Fry | |
| 5,215,818 A | 6/1993 | Silver et al. ................. 428/343 |
| 5,268,228 A | 12/1993 | Orr ............................ 428/343 |
| 5,273,805 A | 12/1993 | Calhoun et al. | |
| 5,296,277 A | 3/1994 | Wilson et al. | |
| 5,322,731 A | 6/1994 | Callahan, Jr. et al. | |
| 5,344,681 A | 9/1994 | Calhoun et al. | |
| 5,362,516 A | 11/1994 | Wilson et al. | |
| 5,449,540 A | 9/1995 | Calhoun et al. | |
| 5,458,983 A | 10/1995 | Wang et al. | |
| 5,487,929 A | 1/1996 | Rusincovitch, Jr. et al. | |
| 5,571,617 A * | 11/1996 | Cooprider et al. .......... 428/341 |
| 5,589,246 A | 12/1996 | Calhoun et al. | |
| 5,591,290 A | 1/1997 | Walter et al. | |
| 5,607,763 A | 3/1997 | Matsuda | |
| 5,612,136 A * | 3/1997 | Everaerts et al. ..... 428/355 AK |
| 5,625,006 A | 4/1997 | Callahan, Jr. et al. | |
| 5,639,811 A * | 6/1997 | Plamthottam et al. ...... 524/272 |
| 5,650,215 A | 7/1997 | Mazurek et al. | |
| 5,665,446 A | 9/1997 | Sundet | |
| 5,800,919 A | 9/1998 | Peacock et al. ............. 428/355 |

FOREIGN PATENT DOCUMENTS

| | | |
|---|---|---|
| EP | 324242 | 7/1989 |
| EP | 303430 | 12/1993 |
| EP | 342811 | 7/1995 |
| WO | WO 85/04602 | 10/1985 |
| WO | WO 97/01776 | 1/1997 |
| WO | WO 97/18276 | 5/1997 |
| WO | WO 97/23577 | 7/1997 |
| WO | WO 97/26286 | 7/1997 |

* cited by examiner

Primary Examiner—David W. Wu
Assistant Examiner—Rip A. Lee
(74) Attorney, Agent, or Firm—Renner, Otto, Boisselle & Sklar, LLP

(57) ABSTRACT

Acrylate copolymer pressure-sensitive adhesive constructions are described which provide excellent retention of rivet properties. Tenting around rivets is minimized even after undergoing thermal aging while in contact with additive rich films like PVC. This is achieved by the inclusion of a synergistic amount of an N-vinyl lactam monomer and acid monomer with the bulk of the monomers being an alkyl acrylate save and/or methacrylate esters. A concomitant increase in cohesive strength is also achieved which affords good removal characteristics. The use of appropriate adhesive blends is further disclosed which allows retention of these features while also improving cold temperature properties.

27 Claims, 2 Drawing Sheets

ADHESIVES WITH IMPROVED RIVET PROPERTIES AND LAMINATES USING THE SAME

CROSS REFERENCE TO PROVISIONAL APPLICATION

This application claims priority from provisional application Ser. No. 60/101,538, filed Sep. 23, 1998, the entire disclosure of which is hereby incorporated by reference.

TECHNICAL FIELD OF THE INVENTION

This invention relates to pressure sensitive adhesive laminates that have superior adhesion properties when applied to curved and uneven surfaces. The invention also relates to labels and tapes using the adhesive.

BACKGROUND OF THE INVENTION

This invention concerns pressure sensitive adhesive laminates (comprising typically of a facestock, adhesive and release coated liner) that are used to primarily make signs. The sign may be used on the side of vehicles for the purposes of advertisement, decoration, and/or information. The desirable functional features of such laminates, include the ability to readily hand-peel the adhesive containing film off from the release liner and apply on to a variety of substrates during hot or cold seasons; conform well over rivets and corrugation (to look as though the graphics containing laminate signs were painted); allow for the ability to reposition the laminate by minimizing initial adhesion to substrate; minimize or eliminate trapping of air bubbles during application to substrates; offer excellent compatibility with various printing techniques as well as good reception to various type of printing inks; tolerate a wide variation in outdoor weather conditions such as rain, solar irradiation, winter as well as summer temperatures; remove cleanly when desired from the side of these vehicles without leaving adhesive residue or film breaking due to becoming brittle and offer sufficient adhesion to various metal and painted and plastic substrates over a wide range of temperatures spanning from summer to winter months. Obtaining all the desirable product attributes successfully within a laminate is, therefore, quite a challenge that requires the skillful combination of facestock, adhesive and release liner with optimum requisite properties.

U.S. Pat. No. 3,728,148 deals with a PSA for electrical tapes and teaches the use of an alkyl acrylate ester with 10–30% of a N-vinyl lactam and a modifying comonomer.

U.S. Pat. No. 4,364,972 deals with a PSA containing an alkyl acrylate ester and 15–50 parts by weight of N-vinyl pyrrolidone. The adhesive has high adhesion and cohesion and adheres strongly to paints, rubber or plastic foam. The application contemplated is to adhere plastic molding strips to autos.

U.S. Pat. No. 4,370,380 deals with a blend of two polymers. First polymer is a water soluble polymer of a vinyl lactam with 1–80 mole % of a comonomer. Second polymer is a tacky water insoluble copolymer of an acrylate ester with 1–12% by weight of an acidic comonomer. The resulting pressure-sensitive adhesive has moisture permeability and is used for skin adhesion.

U.S. Pat. No. 4,510,197 deals with a water vapor permeable PSA comprising from about 79–89% of n-butyl acrylate, from about 10–20% of a hydrophilic n-vinyl lactam and from about 1–5% of an acid containing comonomer.

U.S. Pat. No. 4,818,610 deals with a tape having a plurality of layers which cannot be delaminated due to migration polymer chains of the contiguous layers. A PSA of an alkyl acrylate with a minor proportion of polar copolymerizable monomers selected from n-vinyl pyrrolidinone and acrylic acid is disclosed.

U.S. Pat. No. 4,968,562 deals with a hollow, inherently tacky removable microsphere PSA containing nitrogen and acid free.

U.S. Pat. No. 4,988,742 deals with a PSA terpolymer comprising a) from 60–95 parts of a photopolymerized polymer of monomers containing i) 60–96 parts alkyl acrylate, ii) 2 to 15 parts of a strongly polar copolymerizable monomer, iii) 2 to 25 parts of a strongly polar and moderately polar monomer, b) 40 to 5 parts of hydrogenated rosin ester tackifier and c) 0.01 to 1 parts of a photoinitiator. These tackified polymers are alleged to have lower Tg than polymers of the same composition without tackifier. These polymers are alleged to have significantly higher shear and adhesion to lower energy substrates.

EP 303430 deals with a PSA comprising 50–95 parts of UV polymerized polymer of I) acrylate and ii) 2–15 parts of a strongly polar comonomer and iii) 0 5–30 parts of moderately polar monomer such as N— vinyl pyrrolidinone, N-vinyl caprolactam, further comprising 0.01–1 wt. % crosslinker and b) 5–50 parts of t-butyl styrene tackifier.

EP 324242 deals with a foam like PSA tape where the PSA comprises of a) polymer of 70–100 parts of acrylate and b) 30–0 parts of a moderately polar comonomer selected from NVP, N-vinyl caprolactam and c) 0.01 to 1 part of hexanediol diacrylate, amino formaldehyde or trihalotriazine crosslinking agent.

EP 342811 deals with a PSA comprising 60–88 parts of an alkyl acrylate, 2–30 parts of a polar nitrogen containing vinyl monomer, and 0–12 parts of a vinyl carboxylic acid, said copolymer being intimately blended with 2–25% of plasticizer. Excellent shear adhesion retention after prolonged contact with plasticized vinyl substrate is claimed.

SUMMARY OF THE INVENTION

The present invention is directed towards pressure-sensitive adhesive compositions that exhibit excellent rivet performance (minimizing the tendency towards tenting due to uneven surface features like rivet heads, contours and corrugations) and outstanding removal characteristics (peels off cleanly without leaving any residue on the substrate). Two key monomers are used in combination in the pressure-sensitive adhesives of this invention to impart unique properties to the resulting polymers. The monomers are at least one acid containing monomer in combination with at least one nitrogen containing monomer, such as a N-vinyl lactam.

The pressure sensitive adhesives provide improved removability of the laminate from the substrate even after aging for extended time periods. The cohesive integrity of the laminate is reflected in the ability to peel it off cleanly from the substrate. Superior performance requires the presence of both acid and nitrogen containing monomers. In one embodiment, superior performance is obtained with additionally using the appropriate cast vinyl facestock.

DETAILED DESCRIPTION OF THE PREFERRED EMBODIMENTS

Figure 1:
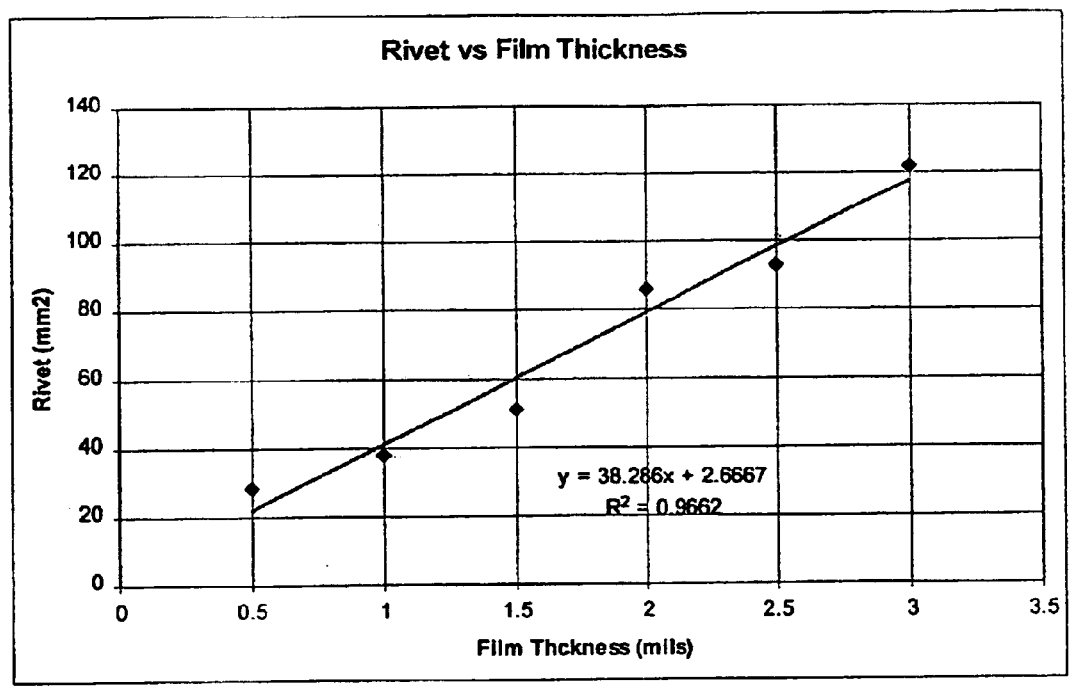
FIG. 1 graphically shows the relationship of film thickness and rivet performance.

As described above the present invention relates to adhesives, adhesive blends and laminates prepared therefrom. One aspect of the present invention provides a laminate that can be hand applied to sides of vehicles that often contain uneven surfaces like rivets, corrugations, etc. The adhesives are co-polymers of an acrylate or methacrylate ester, a nitrogen containing monomer, an unsaturated carboxylic acid, and optionally a monomer containing at least one cross-linkable site. The polymers generally have a glass, transition temperature of less than about 10° C., or preferably less than about –0° C., or most preferably less than about –15° C. The polymers typically have a weight average molecular weight of at least about 200,000, preferably from about 200,000 to about 700,000. Here and elsewhere in the specification and claims the range and ratio limits may be combined. The weight average molecular weight was determined by size exclusion chromatography using polystyrene for calibration.

Polymers of the instant invention may be synthesized by solution, emulsion and bulk polymerization. It is presently preferred that they be formed by solution polymerization. Polymers may be cross-linked to the desired extent, prior to use, using heat, ionic additives, catalysts, actinic or electron beam radiation and the like.

The acrylic or methacrylic ester polymers which may be prepared by polymerizing an alkyl or hydroxyalkyl acrylate or methacrylate ester, one or more of the above nitrogen containing monomers and a carboxylic acid.

The acrylate or methacrylate esters include those having from about 1 to about 24, or from about 2 to about 18, or from about 4 to about 16 carbon atoms in the ester group. The alkyl acrylate and methacrylate esters include without limitation 2-ethyl hexyl acrylate, isooctyl acrylate, butyl acrylate, sec-butyl acrylate, methyl butyl acrylate, 4-methyl-2-pentyl acrylate, isodecyl methacrylate and their hydroxy substituted analogs, and mixtures thereof. Isooctyl acrylate and 2-ethyl hexyl acrylate are particularly preferred. The acrylate ester or methacrylate esters are generally present in a major amount, e.g. greater than 50%. Typically the acrylate or methacrylate ester is present in an amount from about 55% to about 90%, or from about 60% to about 85%, or from about 65% to about 80% by weight. Here and elsewhere in the specification and claims the range and ratio limits may be combined.

The nitrogen containing monomers include N-vinyl lactams. Examples of useful nitrogen containing monomers are N-vinyl pyrrolidone, N-vinyl caprolactam, 1-vinyl-2-piperidone, 1-vinyl-5-methyl-2-pyrrolidone, and the like. N-vinyl pyrrolidone is preferred. The level of nitrogen containing monomer is generally from about 8% to about 30%, or from about 9% to about 18%, or from about 10% to about 14% by weight. In one embodiment, the total level of nitrogen containing monomer is from about 10% to about 35%, or from about 11% to about 25%, or from about 12% to about 15% by weight.

In one embodiment, the pressure sensitive adhesive is prepared in the presence of an unsaturated carboxylic acid. The unsaturated carboxylic acids include acrylic acid, methacrylic acid, fumaric acid, maleic acid or anhydride, allyl acid, or mixtures. The unsaturated carboxylic acid is generally present in an amount from 0.5% to about 15%, or from about 2% to about 12%, or from about 4% to about 10% by weight.

In one embodiment, the pressure sensitive adhesive is prepared with a glycidyl monomer. The glycidyl monomer include epoxy acrylate or methacrylate esters, and glycidyl allyl esters. The glycidyl monomers are present in an amount from 0% to about 3%, or from about 0.05% to about 2% or from about 0.3% to about 2%, or from about 0.08% to about 1% by weight. In one embodiment, the glycidyl monomer is present most preferably in an amount of less than about 0.5%, or less than about 0.3%, or preferably less than about 0.2% by weight. In this embodiment, the glycidyl monomer is present at a level of at least about 0.01% by weight.

In one embodiment, the polymers include at least one alkyl acrylate and methacrylate ester containing less than 4 carbon atoms in the alkyl group. Examples of these monomers include methyl acrylate, ethyl acrylate, methyl methacrylate, ethyl methacrylate and the like. Methyl acrylate is particularly preferred. These monomers are present in an amount from 0% to about 35%, or from about 5% to about 30%, or from about 10% to about 25% by weight.

The polymers may include other co-polymerizable monomers. Typically these monomers are present in an amount from 0% to about 33%, or from about 1% to about 20%, or from about 3% to about 15% by weight. These other monomers are selected to provide the desired glass transition temperature for the polymer. Other monomers include polystyryl ethyl methacrylate, acetoacetoxy ethyl methacrylate, alpha olefins (e.g. $C_{2-8}$ alpha-olefins), such as ethylene, propylene and butylene, and vinyl esters of alkanoic acids containing more than three carbon atoms.

The pressure sensitive adhesives of the present invention exhibit good adhesion to high-energy surfaces such as stainless steel, aluminum and painted panels. These adhesives and blends therewith help retain the adhesive performance e.g. required for superior performance over rivet and corrugated surfaces, without compromising either the cohesive strength (important for long term removability properties) or cold temperature properties. The adhesive composition is particularly well suited for use with films like PVC that are known to often contain migratory additives, such as plasticizers, which are capable of compromising adhesive performances. Blends of appropriate adhesive formulations particularly help overcome the cold temperature deficiency of high NVP polymers while still maintaining good aged Rivet performance and long term removability characteristics.

In one embodiment, the pressure-sensitive adhesive polymers of the present invention are prepared by co-polymerizing a mixture of monomers comprising from about 55% to about 85% by weight of an alkyl acrylate and/or methacrylate ester containing 4 to about 12 carbon atoms in the alkyl group; from 0 to about 1% by weight of a glycidyl monomer; from about 10% to about 30% by weight, preferably from 10% to about 15% by weight of a nitrogen monomer; from 0.5% to 15% by weight, preferably from about 5% to about 15% by weight of an unsaturated carboxylic acid, most preferably from about 3% to about 8% by weight; from 0 to about 30% by weight of an alkyl acrylate and/or methacrylate ester containing less than 4 carbon atoms in the alkyl group, most preferably from about 12% to about 22% by weight, and optionally from 0 to about 33% by weight of one or more other comonomers to provide a balance of desirable polymer properties such as glass transition temperature.

The copolymers may be synthesized using solution emulsion, and bulk polymerization techniques. It is presently preferred to prepare the copolymers in solution using a mixture of solvents. The present preferred solution polymerization involves the use of heptane, hexane, ethyl acetate, acetone, or blends thereof, such as blends of (1) ethyl acetate and hexane, (2) ethyl acetate and heptane, or (3) ethyl acetate and acetone. The ratio of solvents is adjusted to provide a reflux temperature from about 68° C. to about 78° C. The solids content during polymerization may typically range from about 30% to about 60% in order to achieve the desired weight average molecular weight, and yet achieve viscosities that are manageable in the reactor. The reaction occurs in the presence of free-radical initiators, preferably of the azo type, for example, 2, 2'-azobis (isobutyronitrile). The polymers formed are solvent soluble polymers. In one embodiment, the glycidyl monomer is limited to 3% by weight of the total monomers to avoid the possibility of cross-linking, by opening of the oxirane group, during the polymerization process. Polymers can, as desired, be post-polymerization cross-linked using heat, catalysts, actinic or electron beam radiation and the like. The adhesive properties can, further be, manipulated and modified by additions of additives such as tackifiers, plasticizers, etc.

The following examples relate to the co-polymers of the present invention. Unless otherwise indicated here or throughout the specification and claims, the range and ratio limits are by weight, the temperature is room temperature in degrees Celsius and the pressure is atmospheric pressure.

EXAMPLE A

A monomer mixture is made up by mixing 216.3 g. of 2-ethyl hexyl acrylate, 40.76 g of methyl acrylate, 0.32 g. of glycidyl methacrylate, 38.04 g of N-vinyl pyrrolidone and 22.05 g of acrylic acid. A portion of (79.37 g) of this mixture is introduced to a 2-liter reactor equipped with a pitched turbine agitator, a reflux condenser and a thermistat. Also, 34.4 g. of ethyl acetate and 39.4 g of hexane are added to the reactor. The contents of the reactor are heated to reflux and 0.12 g of Vazo 64, (manufactured and sold by duPont) in 5.0 g of ethyl acetate is added. After vigorous reflux started in a short time and the contents of the reactor are held for 5 minutes. At this time, the remaining monomers are mixed with 268.6 g. of ethyl acetate, 37.6 g. of hexane and 0.35 g. of Vazo 64 and are added as a single feed mixture over 3.5 hrs. All through the feed, temperature is maintained to keep reactor contents under reflux. One hour after end of feed, 0.17 g. Vazo 64 is added in 5 g. ethyl acetate and temperature is maintained for an additional hour. The percentage of solids content at the end of reaction is 47% and the viscosity is 8680 cps using #4@20 on a Brookfield viscometer.

EXAMPLE B

A pressure sensitive adhesive is prepared as describe in Example A except isooctyl acrylate is used in place of 2-ethylhexyl acrylate.

EXAMPLE C

A monomer mixture is made up by mixing 216.3 g. of 2-ethyl hexyl acrylate, 40.8 g of methyl acrylate, 0.13 g. of glycidyl methacrylate, 38 g of N-vinyl pyrrolidone and 22.1 g of acrylic acid. A portion of (66 g) of this mixture is introduced to a 2-liter reactor equipped with a pitched turbine agitator, a reflux condenser and a thermistat. Also, 30 g. of ethyl acetate and 20 g of heptane, 5 g of methanol, 23.4 g of acetone are added to the reactor. The contents of the reactor are heated to reflux and 0.12 g of Vazo 64, are manufactured and sold by duPont in 5.0 g of ethyl acetate is added. After vigorous reflux started in a short time and the contents of the reactor are held for 5 minutes. At this time, the remaining monomers are mixed with 257.3 g. of ethyl acetate, 36 g. of heptane and 0.35 g. of Vazo 64 and are added as a single feed mixture over 3.5 hrs. All through the feed, temperature is maintained to keep reactor contents under reflux. One hour after end of feed, 0.17 g. Vazo 64 is added in 5 g. ethyl acetate and temperature is maintained for an additional hour. The percentage of solids content at the end of reaction is 46% and the viscosity is 3025 cps using #4@20 on a Brookfield viscometer (@30% solids).

EXAMPLE D

A monomer mixture is made up by mixing 216.3 g. of 2-ethyl hexyl acrylate, 40.8 g of methyl acrylate, 38 g of N-vinyl pyrrolidone and 22.1 g of acrylic acid. A portion of (66 g) of this mixture is introduced to a 2-liter reactor equipped with a pitched turbine agitator, a reflux condenser and a thermistor. Also, 30 g. of ethyl acetate and 20 g of heptane, 5 g of methanol, 23.4 g of acetone are added to the reactor. The contents of the reactor are heated to reflux and 0.12 g of Vazo 64, are manufactured and sold by duPont in 5.0 g of ethyl acetate is added. After vigorous reflux started in a short time and the contents of the reactor are held for 5 minutes. At this time, the remaining monomers are mixed with 253.7 g. of ethyl acetate, 36 g. of heptane and 0.35 g. of Vazo 64 and are added as a single feed mixture over 3.5 hrs. All through the feed, temperature is maintained to keep reactor contents under reflux. One hour after end of feed, 0.17 g. Vazo 64 is added in 5 g. ethyl acetate and temperature is maintained for an additional hour. The percentage of solids content at the end of reaction is 46% and the viscosity is 1100 cps using #4@20 on a Brookfield viscometer(@30% solids).

The following table contains further examples of the polymers of the present invention. The following examples follow the similar procedure of Example A. The amount of material is parts by weight. In the table, NVP refers to N-vinyl-pyrrolidone, MeA refers to methyl acrylate, GMA refers to glycidyl methacrylate, AA refers to acrylic acid, and 2-EHA refers to 2-ethylhexyl acrylate.

| Example | NVP | MeA | GMA | AA | 2-EHA |
|---------|-----|------|-----|-----|-------|
| E | 30 | 0 | 0 | 3.0 | 67.0 |
| F | 12 | 12.8 | 0.1 | 6.9 | 68.2 |
| G | 12 | 12.9 | 0 | 6.9 | 68.2 |
| H | 12 | 0 | 0.1 | 6.9 | 81.0 |
| I | 12 | 12.6 | 0.3 | 6.9 | 68.2 |
| J | 12 | 0 | 0.3 | 6.9 | 80.8 |
| K | 12 | 4 | 0.3 | 6.9 | 76.8 |
| L | 12 | 8 | 0.3 | 6.9 | 72.8 |
| M | 12 | 12.8 | 0.3 | 3.6 | 71.3 |
| N | 12 | 12.8 | 0.3 | 6.9 | 68.0 |
| O | 10 | 13.6 | 0.3 | 7.0 | 69.1 |
| P | 10 | 10 | 0.3 | 7.0 | 72.7 |
| Q | 10 | 12 | 0.3 | 7.0 | 70.7 |
| R | 7.9 | 16.6 | 0.3 | 7.0 | 68.2 |
| S | 7.9 | 16.6 | 0.3 | 6.9 | 68.3 |
| T | 7.9 | 16.9 | 0.1 | 6.9 | 68.2 |
| U | 7.9 | 12.8 | 0.3 | 7.0 | 72.0 |
| V | 8 | 12.8 | 0.3 | 3.6 | 75.3 |
| W[1] | 12 | 12.8 | 0 | 6.9 | 68.2 |

[1]made as described in Example D.

In another embodiment, the above pressure sensitive adhesives are used in combination with a second pressure sensitive adhesive, preferably another acrylate or methacrylate pressure sensitive adhesive. In this embodiment, the first pressure sensitive adhesive will have a higher level of nitrogen containing monomer than the second pressure sensitive adhesive. The first adhesive generally has at least about 8% by weight of a nitrogen containing monomer.

Typically the second pressure sensitive adhesive will contain less nitrogen containing monomer than the first adhesive, usually less than 10%, or less than 8% or less than 5%, or less than 4% nitrogen containing monomer. These adhesives may be prepared as described above except that for the level of nitrogen containing monomer. In one embodiment, the adhesives are made without nitrogen containing monomers.

In one embodiment, the pressure sensitive adhesive is a blend of (1) one or more of the above described pressure sensitive adhesives and (2) a second pressure sensitive adhesive comprising (a) a major amount of at least one acrylate or methacrylate ester, (b) from about 0.5% to about 10% by weight of at least one nitrogen containing monomer, (c) from about 0.5% to about 15% by weight of an unsaturated carboxylic acid and (d) at least one cross linkable monomer. The amount of the first adhesive is from about 5% to about 85%, or from about 15% to about 75% or from about 25% to about 65% by weight of the blend. The second adhesive is generally present in an amount from about 15% to about 95%, or from about 25% to about 85%, or from about 35% to about 75% by weight. In one embodiment, the adhesives are used at a ratio of first to second adhesive of about (0.5–1.5:1), or about (0.75–1.3:1), or about (1:1).

The second pressure sensitive adhesive may be prepared procedures similar to those described above and to those described in U.S. Pat. No. 4,812,541, whose description is hereby incorporated by reference. The acrylate or methacrylate ester, nitrogen containing monomer, unsaturated carboxylic acid, cross linkable monomer and optional ingredients, such as alkyl acrylate and methacrylate ester containing less than 4 carbon atoms in the alkyl group and co-polymerizable monomer are described above. The amounts of the ingredients unless specifically stated otherwise are the same as those described above for the first pressure sensitive adhesive.

In another embodiment, the pressure sensitive adhesive is a blend of (1) a pressure sensitive adhesive comprising (a) a major amount of at least one acrylate or methacrylate ester, (b) from about 8% to about 30% by weight of at least one nitrogen containing monomer and (c) from about 0.5% to about 15% by weight of an unsaturated carboxylic acid, and (2) a second pressure sensitive adhesive comprising (a) a major amount of at least one acrylate or methacrylate ester, (b) from about 0.5% to about 10% by weight of at least one nitrogen containing monomer, (c) at least one unsaturated carboxylic acid, and (d) at least one cross linkable monomer. The first adhesive may include as additional ingredients as at least one cross linkable monomer, at least one alkyl acrylate and methacrylate ester containing less than 4 carbon atoms in the alkyl group or at least one co-polymerizable monomer. These ingredients and their amounts are given above.

Useful pressure sensitive adhesives that are used with the adhesives of the present invention include those described in U.S. Pat. No. 4,812,541. This patent is hereby incorporated by reference for its disclosure of pressure sensitive adhesives, including component parts and methods of making the same. In another embodiment, the other adhesive may be a commercially available pressure sensitive adhesive such as Polytex 7000 or AS-3261 HS available from Avery Dennison Corporation.

When using the blends, the amount of the adhesives are selected to provide a nitrogen containing monomer content in the blend of at least about 6%, or at least about 7%, or at least about 8%. The amount of the first adhesive is from about 5% to about 85%, or from about 15% to about 75% or from about 25% to about 65% by weight of the blend. The second adhesive is generally present in an amount from about 15% to about 95%, or from about 25% to about 85%, or from about 35% to about 75% by weight. In one embodiment, the adhesives are used at a ratio of first to second adhesive of about (0.5–1.5:1), or about (0.75–1.3; 1), or about (1:1).

The following Example relates to blends of the first and second adhesives. In the following examples the second adhesive (control adhesive) is Polytex 7000 and is similar to Example 1 of U.S. Pat. No. 4,812,541, which has 2% N-vinyl pyrrolidone and 7% acrylic acid.

| Blend Example | POLYMER | CONTROL TO ADHESIVE |
|---|---|---|
| B1 | B | 50:50 |
| B2 | N | 50:50 |
| B3 | A | 50:50 |
| B4 | G | 50:50 |
| B5 | L | 50:50 |
| B6 | A | 40:60 |
| B7 | A | 60:40 |
| B8 | F | 50:50 |
| B9 | F | 30:70 |
| B10 | E | 70:30 |
| B11 | N | 30:70 |
| B12 | F | 64:36 |
| B13 | E | (80:20) |
| B14 | N | (64:36) |
| B15 | E | (90:10) |
| B16 | E | (95:5) |
| B17 | E | N |
| B18 | W | 50:50[1] |
| B19 | D | 60:40 |

[1]blended with AS 3261- HS instead of Polytex 7000

In one embodiment, the pressure sensitive adhesive contains a plasticizer. The plasticizer is a high-boiling solvent or softening agent, usually liquid. It is an ester made from an anhydride or acid and a suitable alcohol that usually has between 6 to 13 carbon atoms. The plasticizers may be adipate, phosphate, benzoate or phthalate esters, polyalkylene oxides, sulfonamides, etc. The plasticizers include but are not limited to DOA plasticizer (Dioctyl adipate), TEG-EH plasticizer (Triethylene glycol di-2-ethylhexanoate), TOTM plasticizer (Trioctyl trimellitate), triacetin plasticizer (Glyceryl triacetate), TXIB plasticizer (2, 2, 4, -trimethyl-1, 3-pentanediol diisobutyrate), DEP plasticizer (Diethyl phthalate), DOTP plasticizer (Dioctyl terephthalate), DMP plasticizer (Dimethyl phthalate), DOP plasticizer (Dioctyl phthalate), DBP plasticizer (Dibutyl phthalate), polyethylene oxide, toluenesulfonamide, dipropylene glycol benzoate, and the like.

The pressure sensitive adhesive may also contain a compatible tackifier. Tackifiers, are generally hydrocarbon resins, wood resins, rosins, rosin derivatives, and the like, which when present in concentrations ranging from about 5 to about 50 by weight of the total adhesive composition, more preferably from about 10 to about 20 by weight, impart pressure-sensitive adhesive characteristics to the elastomeric polymer adhesive formulation. It is contemplated that any tackifier known by those of skill in the art to be compatible with elastomeric polymer compositions may be used with the present embodiment of the invention. Examples of useful tackifiers include Foral 85 & Hercolyn-D (rosin esters available from Hercules), Nirez 2019 (terpene phenolic resin available from Arizona Chemical), etc.

In addition to the tackifiers, other additives may be included in the PSAs to impart desired properties. Antioxidants also may be included on the adhesive compositions. Suitable antioxidants include Irgafos 168 and Irganox 565 available from Ciba-Geigy, Hawthorne, N.Y.

The above adhesive and adhesive blend may be used in laminates having a facestock, such as a flexible vinyl film. The face stock is adhered to the pressure sensitive adhesive. The nature of the facestock plays a role in many of the performance attributes desired in such laminates. Cast vinyl facestocks with a film thickness of about 10 microns to about 200 microns, with approximately 50 microns thicknesses beingmost preferred. Thicker films worsen rivet tenting performance while thinner constructions are superior (see FIG. 2) although physical handling of films much below 50 $\mu$m becomes more difficult and undesirable.

The Young's Modulus (measured following ASTM D 638M-93 guidelines using crosshead speeds of 100% strain/min) ranged from about 9,000 to about 182,000 psi for the cast 50 $\mu$m vinyl films studied with the most preferred range being 30,000–90,000 psi with % strain at break to be >100% most preferably between 120–240%. While a large class of monomeric as well as polymeric plasticizers can be used to get the desired tensile film properties, the latter are more desirable due to their lower propensity for migration. Plasticizer migration can not only compromise adhesive properties but also result in increasing the film modulus (making it stiffer) thereby contributing to worsening rivet tent performance. The class of polymeric plasticizers suitable for optimum cast flexible vinyl films include but not limited to one or more of the following: polymeric/polyester adipate-EM-9776, polymeric/polyester azelates EM-9789 & EM-9790 (from Emery Corporation), polyester adipate —PLR-100 (from Huls America), and polyester sebacate-G-25, polyester adipate-G-54, polyester adipate-G-59 &, P-670, polyester sebacate —P-1070 (from C. P. Hall Corporation) and polyester adipate-Pallomal 656 (from BASF). The organosol for making the cast vinyl films typically used Hi-Sol 10, an aromatic petroleum distillate (available from Ashland Chemical Co), ethyl acetate or other suitable solvent mixtures. The BaZn heat stabilizer used was an organo barium zinc heat stabilizer, product name Mark 2181, (available from Witco Corp) although other related commercial can also be used. The UV absorber used was Cyasorb UV 531 (available from Cyanimid Corp). While the formulations additionally also could incorporate an proprietary epoxy heat stabilizer like ThermChek 909 (available from Ferro Corporation), studies indicate that this additive could be detrimental to rivet performance (see below).

TABLE A

Rivet Performance

| Vinyl/Adhesive | Initial Rivet (mm$^2$) | Aged Rivet (mm$^2$) |
| --- | --- | --- |
| Vinyl A/Control Adhesive | 59 | 173 |
| Vinyl B/Control Adhesive | 63 | 121 |
| 900 W/ B18 + 8% DOA | 94 | 116 |
| 900 W/ B18 + 8% DOA + 0.15% AAA | 88 | 86 |

Aged 60° C./6 days
Experimental Vinyl A = PVC resin Geon 198 + plasticizer G-59 + heat stabilizer Mark 2181 + UV stabilizer UV-531 + white pigment TiO$_2$ + Epoxy plasticizer Thermcheck 909
Experimental Vinyl B = PVC resin Geon 198 + plasticizer G-59 + heat stabilizer Mark 2181 + UV stabilizer UV-531 + white pigment TiO$_2$
900 W = Commercial white cast vinyl available from Avery Dennison Corporation Those skilled in the art would recognize that process conditions like oven temperatures, web speed, etc. also play an important role in obtaining the desired tensile properties.

The release liner is adhered to opposite surface of the pressure sensitive adhesive layer allowing for separating with optimum effort to expose the adhesive surface prior to application on a desired substrate. The low energy release is typically obtained using the appropriate polydimethylsilicone polymer coating available from either solvent based or solventless silicone coating that could be polymerized on the web using a variety of curing techniques including UV, thermal often catalyzed by metals like tin, platinum, etc. Other desirable properties like adhesive repositionability and/or air egress may also be obtained by modifying the release surface. For example, roughening the release surface as taught by Mel Freedman (U.S. Pat. No. 4,713,273) helps avoid problems of air entrapment during application of laminates to substrates. This patent is incorporated by reference. The facestock may also have a tie layer between the pressure sensitive adhesive and the facestock. One useful tie layer is polyamides such as Platamid available from Elf Atochem. In one embodiment, the facestock is any vinyl facestock used for signage, such as a polyvinylhalide polymers, which include polyvinyl chloride and polyvinylidene fluoride. These layers may have additives to improve their performance such as plasticizers, antioxidants and UV radiation absorbers. The pressure sensitive adhesive is also releasably adhered to a release liner such as a silicone liner. In one embodiment, the vinyl film has plasticizers. The vinyl film may also be composed of vinyl chloride copolymerized with acrylate, acrylic acid or blended with other polymers including polyurethane, rubber, etc.

The adhesives are covalently cross linked by the action of the cross linkable monomer during polymerization. In one embodiment, the adhesives cross-linked during post curing of the adhesive after coating. This can be achieved via heat, actinic, electron beam radiation or metal based ionic cross-linking between groups like carboxy, hydroxyl, etc; and/or catalysts that induce reaction between functional groups such as epoxy, carboxy, hydroxy, amino, etc., and/or multifunctional additives such as di-isocyanates, etc. The cross linking agents include aluminum acetylacetonate (AAA), a polyamine, such ethylenepolyamines which include ethylenediamine, diethlyenentriamine (DETA), triethylenediamine (TEDA), tetraethylenepentamine (TEPA), multivalent metal complexes, such as titanium esters (for example Tyzor available from Du Pont), etc. These materials are usually added to the adhesive in solution with a chemical concentration of about 3% to about 15%, or from about 5% to about 10% weight. The crosslinking agent is typically used at a level from about 0.05% to about 1%, or from about 0.075% to about 0.75%, or from about 0.1% to about 0.5% by weight.

In the following tests, all test laminate samples were prepared using commercial 50 $\mu$m thick white vinyl 900 White films available from Avery Dennison's Graphics Division that were precoated with 2–7 $\mu$m thick tie/barrier layer Platamid layer. This tie layer provides the important function of robustly anchoring the adhesive to the vinyl contributing to superior long term removal characteristics. Appropriate amounts of adhesive(s) were intimately mixed with crosslinking solutions (e.g. 8–10% toluene solution of aluminum acetylacetonate-(AAA) and/or triethylenediamine-(TEDA). Unless stated otherwise, the crosslinker level used for optimum performance is 0.3% by weight. These adhesive solutions were diluted down appropriately to achieve good hand drawn coating on release liner stock using a "bull nose". The 32 gms/sq.m coat weights were drawn typically on 1.5 mil siliconized polyethylene terephthalate (PET) liner. The coatings were dried in an oven at 70° C. for 10 minutes and 100° C. for 5 minutes to ensure adequate crosslinking. The adhesive coated PET liner was then used to transfer coat on to the above mentioned vinyl facestock using a HL-100 laminator (made by Chemsultants, Fairfield, Ohio) operating at 40 psi pressure and a roll speed of 4.5 feet/min.

Samples of the above adhesives were tested for rivet performance. Test laminate samples (prepared as described in the previous paragraph) approximately 3×6 inches in dimension are applied over test panels painted with white, glossy, polyester paint (Polar White) and specially riveted with aluminum rivets. Application is done so as to minimize forming any wrinkles especially around these rivet heads, e.g. Brazier rivet heads, 0.45" (diameter)×0.13" (height)× 0.3" (shaft diameter). Entrapped air is released with the use of pin pricks while a brush with hard bristles and plastic squeegee is used to get the best conformation of the film around the rivet. After 2 days, the panels are placed under a microscope (Olympus SZH zoom stereo microscope using 0.5× objective), an image is captured using a Pulnex CCD camera, and the image is analyzed using Image Pro Plus (version 3.0, Media Cybernetics, Silver Spring, Md.) software. This allowed for quantifying the tenting of the vinyl films around the test panel rivets accurately. The tent area is defined as the difference between the area enclosed by the two contact perimeters measured in the vicinity of the rivet head perimeter where the vinyl breaks contact with the rivet and the perimeter where the vinyl regains contact with the surrounding flat substrate.

Figure 2:
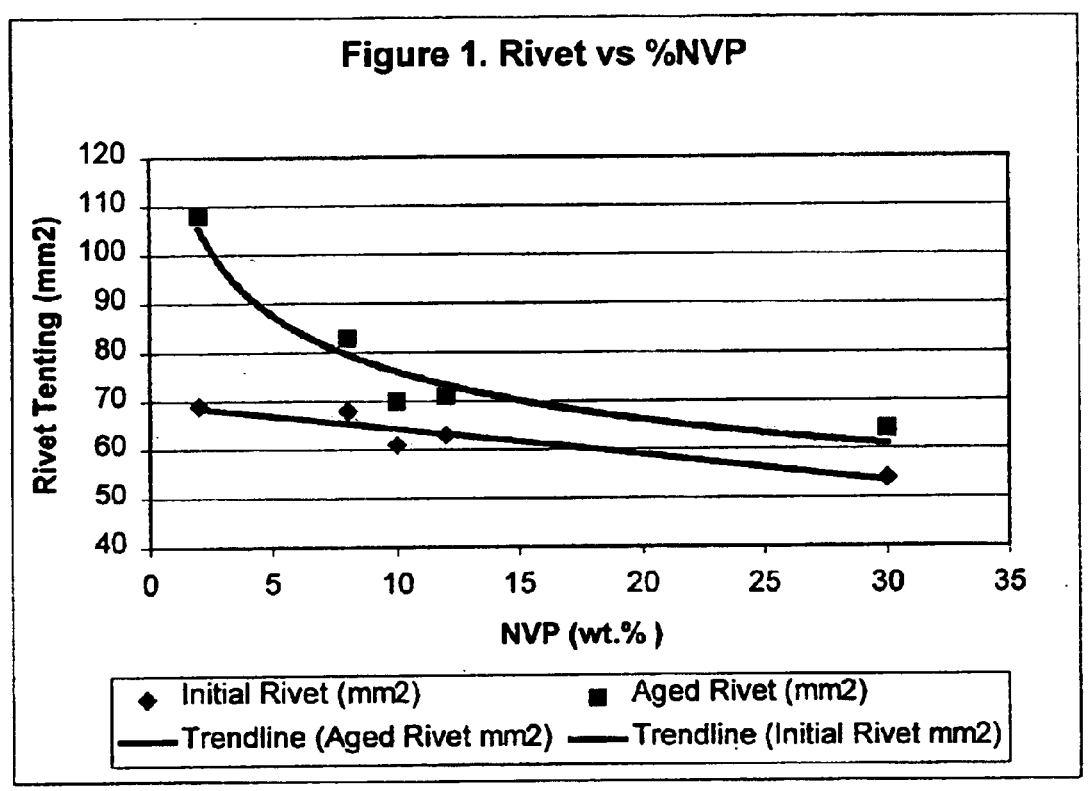
FIG. 2 graphically shows the effect of N-vinyl pyrrolidone monomer on the Rivet tenting performance (measured in $mm^2$) before and after thermal aging at 60° C./4 days where small values being preferred. The corresponding test method is described later within the text.

FIG. 2 shows how higher levels of NVP help retain good Rivet performance even after thermal aging. The alkyl acrylate fractions were adjusted to accommodate the changing levels of NVP within these polymer compositions. The level of acid and crosslinker was kept the same in all these compositions. The control test sample containing 2% NVP has been described U.S. Pat. No. 4,812,541, issued to Mallya et al. and is commercially available from Avery Dennison as Polytex 7000 adhesive.

Interestingly, the cohesive strength increases without compromising peel adhesion as the NVP level increases. This is reflected in Table 1 which compares 1800 peel adhesion and shear on stainless steel panels of two uncrosslinked adhesives, one which contains 2% and another with 12% N-vinyl pyrrolidone monomer. The test laminates were prepared as previously described by laminating to a coated 900 W vinyl facestock.

TABLE 1

| Sample ID/ (Adhesive) | % NVP | 180° Peel[a] (lbs/in) | Shears[b] (mins) |
|---|---|---|---|
| Unaged | | | |
| Control adhesive with no AAA crosslinker | 2 | 5.6 | 40 |
| Example R | 8 | — | 269 |
| Example Q | 10 | — | 606 |
| Example F | 12 | 7.0 | 1467 |

[a]Peels were measured at room temperature using 12 inches/minute cross head speed after 12 minute dwell on stainless steel panels.
[b]Shears measured at room temperature using ½ × ½ inch samples, 1 Kg weight using stainless steel panels. The failure mode in all were cohesive adhesive split.

The high shears measured with Example F adhesive reflects the high cohesive strength of these high NVP containing polymers. The high shear observed reflects the increased cohesive strength which, in turn, is believed to be instrumental towards imparting good long term removability performance. Unexpectedly, this is obtained without compromising the peel adhesion properties.

Poor tenting performance results when the acid level falls below an optimum level with respect to N-vinyl lactam content (see Table 2).

TABLE 2

| Example | % NVP | % AA | Initial (mm$^2$) | Rivet Aged (60° C./4 d) Rivet (mm$^2$) |
|---|---|---|---|---|
| Control Adhesive | 2 | 7.0 | 69 | 108 |
| V | 8 | 3.6 | 105 | 115 |
| M | 12 | 3.6 | 97 | 68 |
| N | 12 | 6.9 | 40 | 69 |

These results are unexpected as a primary purpose in incorporating the N-vinyl lactam is to increase adhesion to vinyl films. The purpose of the acid group is normally to introduce functionality for inducing cross-linking after coating. While not bound by theory, it is presently believed that the carboxylic acid groups and N-vinyl pyrrolidone centers form acid-base links that impart high cohesive strength which, in turn, helps give superior Rivet performance. These acid-base interactions do not seem strong enough, however, to adversely degrade the adhesion properties of these polymers.

One application of the adhesives of the instant invention is the marking of truck panels and the like with an adhesive coated vinyl film. The film is applied over a panel which may be a painted or unpainted aluminum panel fixed with aluminum rivets. The truck panel may also be vinyl. The ability of the adhesive to conform to the contour of the rivet and not lift appreciably after application is highly desirable. A tendency to lift away is known as "tenting" and the greater the separation from the rivet the more unsatisfactory is the adhesive.

Rivet Performance

The initial and aged rivet performance have been listed in Table 3. 3M's Controltac 180-10 Plus™ is a competitive product which is provided as a comparison.

TABLE 3

| | Rivet Performance | |
|---|---|---|
| NVP Content (wt. %) | Initial Rivet (mm$^2$) | Aged Rivet (mm$^2$) |
| Control | 69 | 108 |
| 8 | 68 | 83 |
| 10 | 61 | 70 |
| 12 | 63 | 71 |
| 30 | 54 | 64 |
| 3M Controltac 180-10 Plus ™ | 87 | — |

As can be seen in Table 3, while the Control adhesive shows excellent Rivet performance when "fresh", its performance degrades when the laminate (vinyl/adhesive construction) is thermally aged at 60° C./4–7 days. This degradation in performance is believed to largely stem from the migration of low molecular weight plasticizer from the vinyl into the adhesive. Besides compromising the adhesive performance, plasticizer losses from within the film also results in concomitantly increasing its modulus thus making it "stiffer" and less conformable around rivets. It was also observed that using high levels of crosslinker (1%) degrades Rivet performance dramatically even prior to any thermal aging.

The corresponding performance for the base adhesives are also shown in the Table 4 below for comparison.

TABLE 4

| Description | NVP | MeA | GMA | Initial Rivet (mm$^2$) | Aged Rivet (mm$^2$) |
|---|---|---|---|---|---|
| CONTROL ADHESIVE | 2 | 22.8 | 0.3 | 82 | 112 |
| N | 12 | 12.8 | 0.3 | 53 | 57 (a) |
| F | 12 | 12.8 | 0.1 | | 85 (b) |
| H | 12 | 12.9 | 0.0 | | 71 (b) |
| L | 12 | 8.0 | 0.3 | | 63 (b) |
| F | 12 | 12.8 | 0.1 | 46 | |
| E | 30 | 0.0 | 0.0 | 48 | |
| I | 12 | 12.6 | 0.3 | 49 | |
| R | 7.9 | 16.6 | 0.3 | 110 | 70 |
| E | 30 | 0.0 | 0.0 | 67 | 76 (a) |

(a) Aged @ 60° C./6 days

The unique ability of these adhesives to retain rivet performance even after thermal aging is particularly important when the film facestock is composed of additive rich PVC films. It is well known that PVC film's unique properties are partially derived from the use of a number of additives (plasticizers, fillers, stabilizers, etc.) that are often present in substantial amounts. For example, the level and type of plasticizer used can be varied to provide complete control on the film's mechanical properties. Plasticizer migration is, however, a major drawback in PVC and is well known to compromise adhesive properties. While polymeric plasticizers, such as those used in examples described in this invention report, attempt to minimize such deleterious migrations, it is believed to nevertheless occur. While increasing the molecular weight of these polymeric plasticizers helps towards decreasing the migratory tendency, practical handling and manufacturing of good quality vinyl films becomes increasing more difficult, thus making this approach unsatisfactory.

Plasticizer Tolerance

High NVP polymers tolerate plasticizer better than the 2% NVP adhesive like the Control adhesive. This is reflected in the data shown in the Table 5 below that contains Rivet performance data obtained after deliberately doping the adhesive with dioctylphthalate(DOA) "monomeric" plasticizer.

TABLE 5

| Adhesive of Example | DOA Level (wt. %) | RIVET (INIT) | RIVET (AGED) |
|---|---|---|---|
| I (G) | 0 | 60 | 64 |
| I (G) | 1 | 96 | 84 |
| I (G) | 2 | 105 | 82 |
| B18[1] | 8 | 88 | 86 |
| Control Adhesive | 0 | 80 | 148 |
| Control Adhesive | 1 | 81 | 162 |
| Control Adhesive | 2 | 91 | 124 |

[1]containing 0.15% AAA

Another unexpected consequence of doping these adhesives with plasticizers stemmed from the observation that the mechanical properties of the film were stabilized and could kept from increasing even after thermal aging.

TABLE 6

| Adhesive of Example | % DOA | Young's Modulus (psi)-Initial | Young's Modulus (psi)-After aging @ 60° C./4 days |
|---|---|---|---|
| Control adhesive | — | 51,000 | 59,000 |
| I | 0 | 55,000 | 58,000 |
| I | 1 | 55,000 | 43,000 |
| I | 2 | 55,000 | 38,000 |

This property is desirable is expected to help improve Rivet performance as well as maintain film integrity especially by possible compensation of plasticizer loss expected to occur during the weather aging of the laminate.

Cold Temperature Properties

The cold temperatures properties are listed in Table 7. Higher levels of formulations lead to poor "borderline" performance. Control adhesive and 8% NVP polymers, on the other hand, give good, robust cold temperature performance.

This test attempts to simulate the application of graphics application film at low temperature. The vinyl film side of the laminate is initially laminated with a protective, "premask" such as American Biltrite 6882 using the HL-100 laminator (Cheminstruments, Fairfield, Ohio) using 40 psi pressure and roll speed of 4.5 feet/min. The premask laminated samples were then conditioned at 4° C. for at least 1 hour inside an environmental chamber/room. Working inside this regulated room, the samples were applied to PPG acrylic painted panels using 2 passes of 4.5 lbs roller. The premask tape is immediately peeled off the vinyl surface at a 180° angle and a speed of 50 inches/min using an IMASS release tester. Besides recording the peel strength, the mode of failure is carefully noted and recorded. Lifting of the test strip during peeling constitutes a failure. The adhesive is deemed to pass this test if it stays on the test panel without lifting or showing signs of forming blisters.

TABLE 7

ENV Room Conditions: 4° C. and 45% RH; 50 in/min & 180° Peels;

| Sample ID | NVP | DOA | Failure Mode |
|---|---|---|---|
| BASE POLYMERS | | | |
| E | 30 | — | F |
| I | 12 | 0 | F |
| I | 12 | 4 | F,P |
| I | 12 | 8 | P |
| J | 12 | — | P |
| K | 12 | — | F |
| L | 12 | — | F |
| G | 12 | — | F |
| O | 10 | — | F,P |
| R | 7.9 | — | P |
| Control Adhesive | 2 | — | P |

P = Pass;
F = Fail;

While lowering of methyl acrylate levels (see Examples E and H–J results) and/or adding plasticizers (see G results) do afford ways of improving cold temperature properties of adhesives containing high NVP levels, another quite unexpected finding was from using appropriate adhesive blends (See Table 8 below)

TABLE 8

ENV Room Conditions: 4° C. and 45% RH; 50 in/min & 180° Peels;

| Sample ID | NVP | Failure Mode |
|---|---|---|
| BLENDS | | |
| B12 | 5.6 | P |
| B13 | 7.6 | P |
| B14 | 5.6 | P |
| B15 | 4.8 | P |

P = Pass;
F = Fail;

Long Term Removability

One other important performance property that seems to be enhanced by high NVP levels is the long term removability characteristics of these adhesives.

In the following tests, test strips (1 inch×8 inch) from the laminate samples (vinyl/adhesive/liner) were die cut and 2–3 inches of the adhesive exposed by peeling back the liner. This part was laminated on to 2 inch×5 inch PPG acrylic painted panels using 2 passes of a 4.5 lb. roller. The test panels along with the laminated test strips were placed in ovens at 60° C. for 1–2 weeks and subsequently in a QUV chamber for 1–4 weeks using 8 hrs of UVB-313 irradiation-4 hrs of 100% relative humidity at 60° C. cycle (Q-Panel Instruments). The samples were periodically removed from and hand peeled. The performance was noted and failure mode reported as follows: C=Cohesive failure—when adhesive splits to leave adhesive residue on both the panel as well as the vinyl facestock. F=Face failure—when the adhesive delaminates from the film leaving all the adhesive residue on the test panel. P=Panel failure—when the adhesive comes cleanly off the test panel leaving no residue.

Shown in the following Table 9 are results that reflect their superior performance when compared to CONTROL ADHESIVE or 3M's Controltac™ product.

TABLE 9

| Sample ID | % NVP | Failure Mode |
|---|---|---|
| Base Polymers | | |
| 3M Controltac ™ | — | 50% cohesive adhesive split |
| control | 2 | 50% cohesive adhesive split |
| F | 12 | 100% Panel |
| I | 12 | 100% Panel |
| R | 7.9 | 100% Panel |

Aging conditions: 60° C./6 days + QUVB-313 8 hrs UV-4 hrs 100% RH at 60° C./10 days This desirable attribute is believed to be derived from the exceptional cohesive strength observed in the high NVP polymers. These properties are not compromised when using appropriate adhesive blends either as shown in the following Table 10.

TABLE 10

| Sample ID | % NVP | Failure Mode |
|---|---|---|
| Blends | | |
| B3 | 7 | 100% Panel |
| B4 | 7 | 100% Panel |
| B5 | 7 | 100% Panel |
| B12 | 5.6 | 100% Panel |
| B13 | 7.8 | 100% Panel |
| B14 | 5.6 | 100% Panel |

Aging conditions: 60° C./6 days + QUVB-313 8 hrs UV-4 hrs 100% RH at 60° C./10–12 days Last but not the least, rivet performance is uncompromised provided appropriate adhesive blends are used as shown in the Table 11 below.

TABLE 11

| Blend Example | NVP | Initial Rivet (mm$^2$) | Aged Rivet (mm$^2$) |
|---|---|---|---|
| B1 | 12 | 71 | 71 (a) |
| B3 | 12 | NA | 86 (b) |
| B4 | 12 | 55 | 81 (b) |
| B6 | 12 | NA | 76 (b) |
| B7 | 12 | NA | 76 |
| B8 | 12 | 59 | 70 (a) |
| B9 | 12 | 45 | 63 (b) |
| B10 | 30 | 51 | 68 (a) |
| B12 | 12 | 63 | 84 (a) |
| B13 | 30 | 60 | 63 (a) |
| B15 | 30 | 54 | 79 (a) |
| B16 | 30 | 61 | 87 |

All the blends described above contained GMA levels that were below 0.3% by weight.

An unexpected observation was made that CONTROL ADHESIVE blends made with adhesives with 12% by weight of NVP and 0.3% by weight of GMA performed much worse than those containing <0.3%. This is reflected in the high values observed for aged rivet tenting (compared to those in Table 11) shown in the following Table 12.

TABLE 12

| Blend | Initial Rivet (mm$^2$) | Aged Rivet (mm$^2$) |
|---|---|---|
| B2 | 54 | 105 (a) |
| B5 | 52 | 124 (b) |
| B17 | 62 | 101 (a) |
| B11 | 53 | 101 (c) |
| B4 | 51 | 124, 96 (d) |

(a) Aged @ 60° C./6 days
(b) Aged @ 60° C./8 days
(c) Aged @ 60° C./4 days
(d) Aged @ 60° C./4 days While not bound by theory, this may be resulting from crosslinking induced by NVP catalyzed reaction between acid and oxirane functionalities. It is further presently speculated that NVP accesses these sites more efficiently in the above mentioned blends.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A pressure sensitive adhesive comprising a blend of: (1) a pressure sensitive adhesive comprising: (a) a major amount of at least one acrylate or methacrylate ester; (b) from about 8% to about 30% by weight of at least one nitrogen containing monomer; and (c) at least one unsaturated carboxylic acid, and (2) a second pressure sensitive adhesive comprising: (a) a major amount of at least one acrylate or methacrylate ester; (b) from about 0.5% to about 10% by weight of at least one nitrogen containing monomer; (c) at least one unsaturated carboxylic acid; and (d) at least one crosslinkable monomer.

2. The adhesive of claim 1 wherein (a) of (1) and (2) is independently an acrylate or methacrylate ester containing from about one to about 24 carbon atoms in the alkyl group.

3. The adhesive of claim 1 wherein (a) of (1) and (2) is independently selected from 2-ethyl hexyl acrylate, isooctyl acrylate, butyl acrylate, sec-butyl acrylate, methyl butyl acrylate, 4-methyl-2-pentyl acrylate, isodecyl methacrylate, their hydroxy substituted analogs, and mixtures thereof.

4. The adhesive of claim 1 wherein (b) of (1) and (2) is independently selected from N-vinyl pyrrolidone, N-vinyl caprolactam, 1-vinyl-2-piperidone, 1-vinyl-5-methyl-2-pyrrolidone, and mixtures thereof.

5. The adhesive of claim 1 wherein (b) of (1) and (2) is independently N-vinyl pyrrolidone.

6. The adhesive of claim 1 wherein (c) of (1) and (2) each comprise at least one acid independently acrylic acids, methacrylic acids, fumaric acid, maleic acid or anhydride, allyl acids, and mixtures of two or more thereof.

7. The adhesive of claim 1 wherein (c) of (1) and (2) independently is present in an amount from about 0.5% to about 15%.

8. The adhesive of claim 1 wherein (1) further comprises (d) at least one cross linkable monomer, or mixtures of two or more thereof.

9. The adhesive of claim 8 wherein (d) is at least one glycidyl monomer.

10. The adhesive of claim 8 wherein (d) comprises epoxy acrylate or methacrylate esters or glycidyl allyl esters.

11. The adhesive of claim 8 wherein (d) is present in an amount from about 0.05% to 2%.

12. The adhesive of claim 1 wherein (2) further comprises (e) at least one alkyl acrylate and methylacrylate adhesive ester containing less than 4 carbon atoms.

13. The adhesive of claim 12 wherein (d) is at least one glycidyl monomer.

14. The adhesive of claim 1 wherein (d) the at least one cross linkable monomer is selected from epoxy acrylate or methacrylate esters and glycidyl allyl esters.

15. The adhesive of claim 1 wherein (d) is present in an amount from about 0.05% to 2%.

16. The adhesive of claim 1 wherein (1) and (2) independently further comprise (e) at least one alkyl acrylate and methacrylate ester containing less than 4 carbon atoms in the alkyl group, (f) at least one co-polymerizable monomer, or mixtures of two or more thereof.

17. The adhesive of claim 16 wherein (e) the at least one alkyl acrylate is methyl acrylate, ethyl acrylate, methyl methacrylate, or ethyl methacrylate.

18. The adhesive of claim 17 wherein (f) comprises one or more co-polymerizable monomers selected from polystyryl ethyl methacrylate, acetoacetoxy ethyl methacrylate, alpha olefins, and vinyl esters of alkanoic acids containing more than three carbon atoms.

19. The adhesive of claim 1 further comprising a tackifier, plasticizer, or mixtures thereof.

20. The adhesive of claim 19 wherein the plasticizer is selected from an adipate, a phosphate, a benzoate, a phthalate esters, a polyalkylene oxide, a sulfonamide, and mixtures of two of more thereof.

21. The adhesive of claim 1 further comprising a cross linking agent.

22. The adhesive of claim 21 wherein the crosslinking agent is aluminum acetylacetonate or a polyamine.

23. The adhesive of claim 1 wherein (1)(b) is present in an amount from about 12% to about 30%.

24. A pressure sensitive adhesive comprising a blend of: (1) a pressure sensitive adhesive comprising a copolymer which comprises: (a) a major amount of at least one acrylate or methacrylate ester; (b) from about 8% to about 30% by weight of at least one nitrogen containing monomer; (c) from about 0.5% to about 15% by weight of at least one unsaturated carboxylic acid; and (d) at least one cross linkable monomer and (2) a second pressure sensitive adhesive comprising: (a) a major amount of at least one acrylate or methacrylate ester; (b) from about 0.5% to about 10% by weight of at least one nitrogen containing monomer; (c) from about 0.5% to about 15% by weight of an unsaturated carboxylic acid; and (d) at least one cross linkable monomer.

25. The adhesive of claim 24 further comprising a cross linking agent.

26. The adhesive of claim 25 wherein the crosslinking agent is aluminum acetylacetonate or a polyamine.

27. The adhesive of claim 24 wherein (1)(b) is present in an amount from about 12% to about 30%.

* * * * *